June 13, 1967 J. R. ERWIN 3,324,839
ROLLING PISTON ENGINE
Filed Oct. 8, 1965 2 Sheets-Sheet 1

INVENTOR.
JOHN R. ERWIN
BY John F. Cullen
ATTORNEY

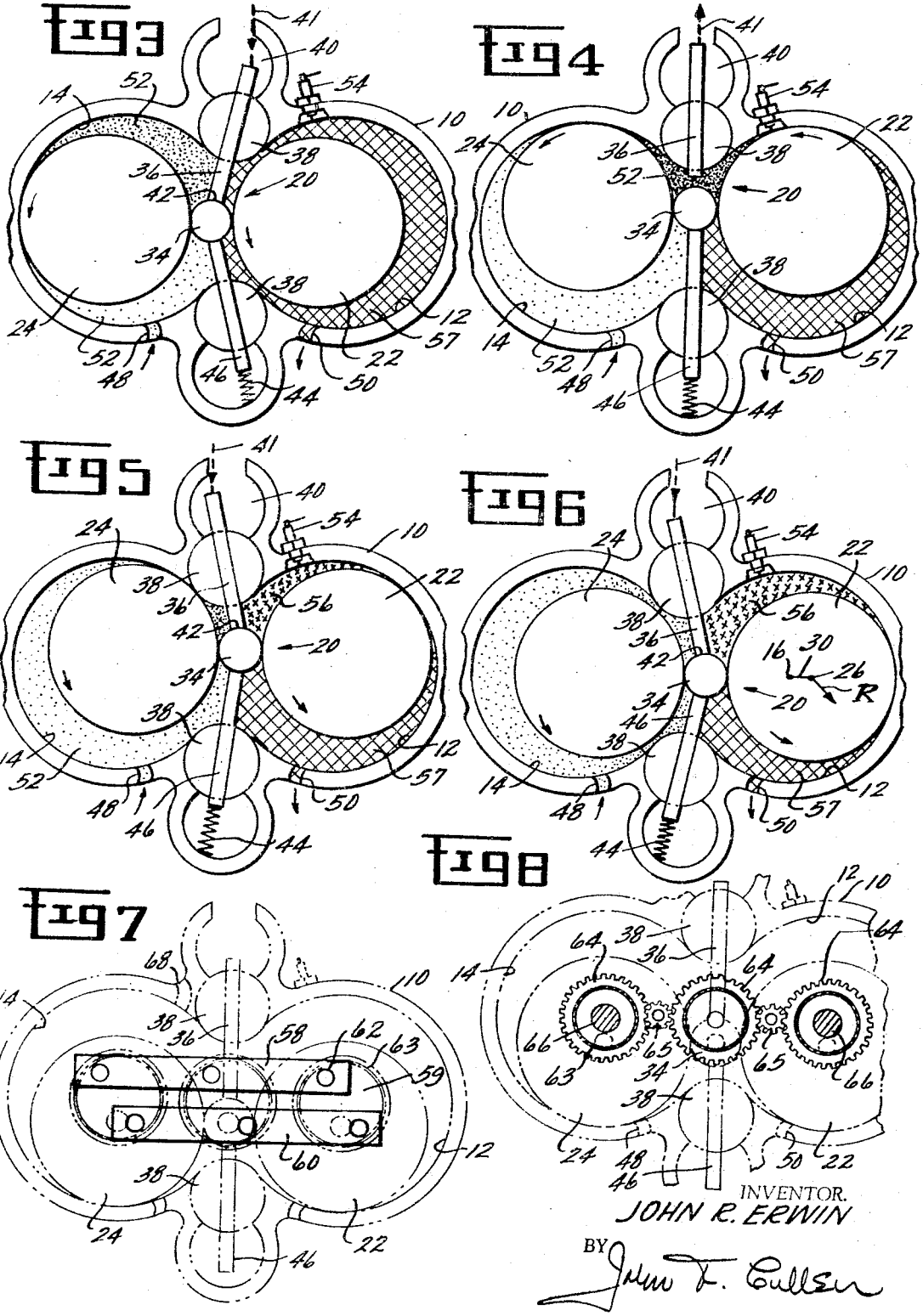

United States Patent Office 3,324,839
Patented June 13, 1967

3,324,839
ROLLING PISTON ENGINE
John R. Erwin, 122 Vermont Ave.,
Cincinnati, Ohio 45215
Filed Oct. 8, 1965, Ser. No. 494,088
16 Claims. (Cl. 123—8)

ABSTRACT OF THE DISCLOSURE

The disclosure shows a rolling piston engine that employs eccentrically rolling and connected pistons in adjacent cylinders so that a charge is compressed one cylinder and by valve means, transferred to the other cylinder for the firing stroke. An important feature is that generally all surfaces are circular for easy manufacture and operation of parts by pure rolling motion.

Figure 1:
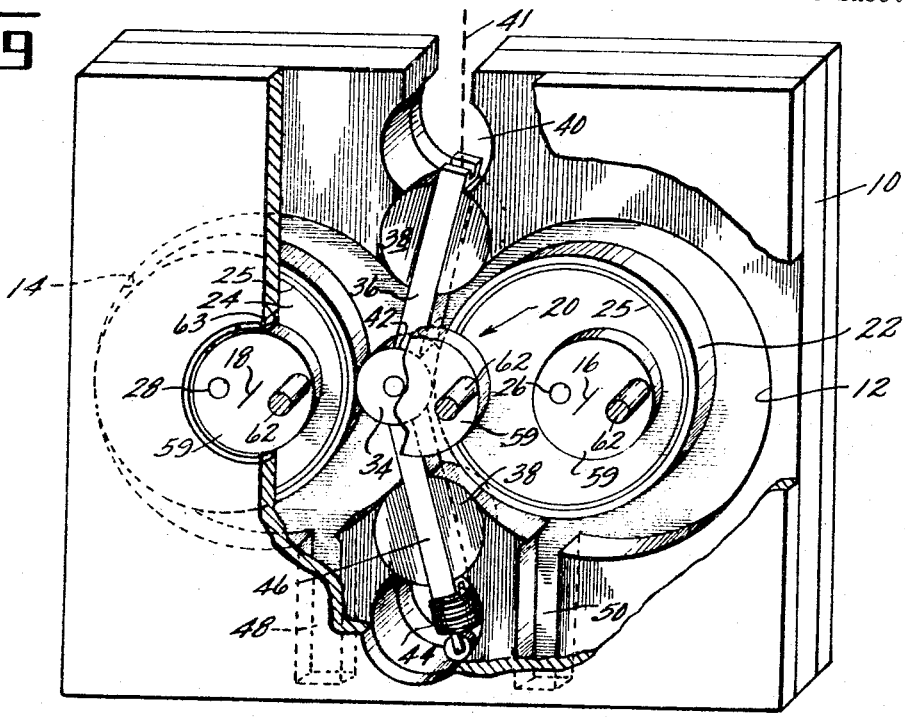

For purposes of explanation, the invention is described as applied to a positive displacement rotary internal combustion engine. However, the same basic mechanism can be used as a gas compressor, liquid pump or hydraulic or pneumatic motor and the term "engine" is intended to include such devices.

The present piston type engine, as used in automobiles and the like, is limited in speed in the larger sizes because of the inertia of the reciprocating parts. In such an engine, the pistons must accelerate and decelerate, stop at the top of the stroke and at the bottom of the stroke. Further, the crankshaft parts are speed limited because they are difficult items to balance since they are peculiar shaped in multi-cylinder engines. Thus, the top speed of such engines and the power that they can produce is limited. It is to be noted also that the volume in which the crankshaft of the engine operates—the crank case—cannot be used for power production so is wasted space.

In recent years various types of rotary engines have appeared. The well known Wankel engine is a prime example of a rotary engine. A serious difficulty with the rotary engine is that, while it eliminates reciprocating motion to make possible continuous rotation like a gas turbine, it has been bothered with sealing problems because of the sliding or friction motion of the rotating piston within its cylinder. It is well known that the piston is a multi-sided pistion which operates in a cylinder made up of lobes. Thus, there is a continuous sliding action of the extremities of the piston on the cylinder wall. This occurs also in an area that is under high pressure in the compression cycle and under both high pressure and high temperature in the expansion cycle. This is a serious limiting obstacle to the application of the known rotary engines for practical use. Additionally, the multi-sided piston and the lobes are not of standard configuration but are complex curves presenting difficult manufacturing and difficult overhaul problems.

The main object of the present invention is to provide a positive displacement type rotary engine in which pure rolling motion of the main components occurs for all parts of the cycle.

Another object is to provide such an engine in which reciprocating motion of main working parts is eliminated and continuous rotation is employed in the moving parts.

It is also an object to provide such an engine which requires very little crankshaft area and, where the crankshaft is employed, it is in a power producing area so no space is wasted.

A further object is to provide such an engine which employs rotating cylindrical pistons within larger round cylinders during the whole cycle of operation so that only pure rolling motion occurs.

Still another object is to provide such an engine wherein the intake stroke, because of the circular piston, increases rapidly in volume and the expansion stroke is subject to a large piston area and has a short stroke.

Additionally, it is an object of the invention to provide such an engine wherein the valving is extremely simple and in which power may be removed in numerous ways such that the power output is at the same speed as the rolling pistons.

A final object is to provide such an engine wherein the compression ratio may be very easily varied and wherein the engine may be stacked to provide a multi-cylinder engine for extremely smooth and fast operation.

Briefly stated, the invention is directed to a rolling piston engine which has an engine block with a pair of adjacent cylinders that are parallel to one another in the block. The cylinders are provided with a communicating opening between them and each cylinder has a smaller diameter cylindrical piston disposed in it to roll eccentrically around the inner periphery of the cylinder. A sealing roller is located in the opening between the rolling pistons and in contact with the pistons at all times. A timed valve means is disposed in the block to extend into the opening on one side of the sealing roller and is biased in contact with the roller to control communication between the cylinders. A sealing means, in the form of a valve-like member, is disposed on the other side of the roller and is biased into contact with the roller at all times. At least one intake port is disposed in the block into one cylinder and at least one exhaust port is disposed in the block communicating with the other or power cylinder substantially opposite the valve. Means is used to connect the pistons in tandem and eccentrically of the cylinder centers which means may be a link or gearing structure. The means also connects the sealing roller and may connect with the valve to maintain proper phase relationship between the pistons, the valve, and the sealing roller. Suitable spark means may be provided in one of the cylinders. The operation of the engine is such that fluid is compressed in one cylinder by rolling of the piston in that cylinder and is transferred through the timed valve means to the other cylinder for firing and expansion. This occurs by pure rolling motion between the cylindrical surfaces of the pistons in the cylinders to provide a sealing action and produce power. Any suitable means is connected to the piston or pistons to remove power from the engine. Additionally, the apparatus just described may be stacked in tandem and interconnected in sets to provide a multi-cylinder engine which sets are operated out of phase with one another for smooth performance. Further, dynamic balance can be obtained without external weights.

Figure 2:
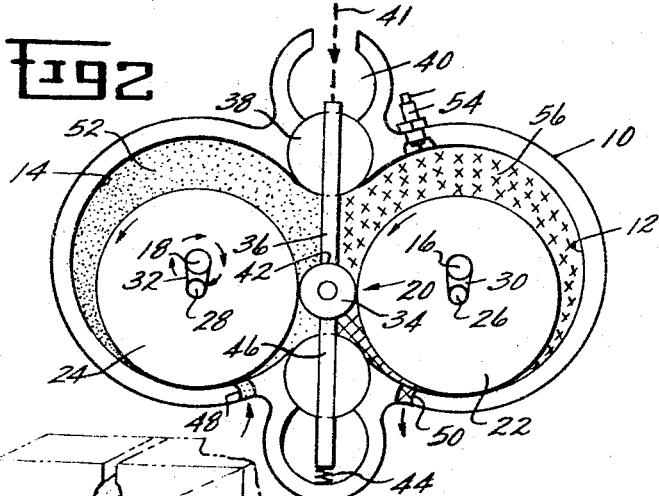
Figure 9:
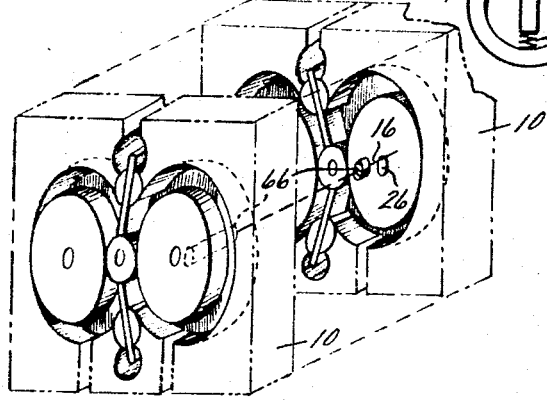

While the specification concludes with claims particularly pointing out and distinctly claiming the subject matter which is regarded as the invention, it is believed the invention will be better understood from the following description taken in connection with the accompanying drawings, in which:

FIGURE 1 is a partial view in perspective illustrating the primary elements of the rolling piston engine, FIGURE 2 is a diagrammatic sketch illustrating the pistons at the start of the compression stroke, FIGURE 3 is a similar diagrammatic sketch illustrating the position of the pistons after 90° of rotation, FIGURE 4 is a similar view illustrating rotation after 180° and the end of the compression stroke, FIGURE 5 is a similar diagram illustrating the position of the parts after 225° of rotation and at substantially the start of the combustion stroke, FIGURE 6 is a similar view illustrating the position of the parts at 270° during the power stroke, FIGURE 7 is a diagrammatic view illustrating the link connection between the pistons and the rolling seal that may be used for power takeoff purposes, FIGURE 8 is a view similar to FIGURE 7 showing the use of gears for the interconnection and power takeoff, and FIGURE 9 is a diagrammatic exploded perspective illustration of the parts using a plurality of sets of rolling piston engines in side-by-side relation and connected together to provide a multi-piston engine.

Referring first to FIGURE 1, there is shown a general view of the layout or environmental arrangement of the rolling piston engine. The engine comprises a block member 10 which is the usual engine block. In order to provide room for the power developing pistons, the block is provided with a pair of adjacent cylinders 12 and 14 in much the manner of a conventional engine. For convenience of description, cylinder 12 may be designated the power cylinder. It will be noted that the cylinders have parallel centerlines 16 and 18 respectively in the block. The cylinders however differ significantly from the conventional engine in that there is an opening generally indicated at 20 between the cylinders. Thus, there is communication between the cylinders through this opening. It should be noted that the depth of the cylinders may be shallow or deep and, as will become apparent, need only be deep enough to accommodate the moving parts depending on the power desired. Typically, the cylindrical depth may be equal to the piston diameter.

Reference is now made to FIGURE 2 where block 10 is shown as a wall illustrating the configuration that might be used. In order to develop power, there is disposed in each of the cylinders a smaller diameter piston 22 and 24. Each piston is disposed to roll eccentrically around the inner periphery of its cylinder. Suitable piston rings 25 may be used and it will be apparent that, because of the low sliding velocity, good sealing is obtained. The centers of the pistons are thus located at 26 and 28 respectively. Thus, the eccentricity or crank arms of the pistons within their respective cylinders are the moment arms 30 and 32 respectively from the cylinder centers. For purposes of explanation, the pistons are designed to roll counterclockwise as shown by the arrows and thus move clockwise around the inner periphery of the respective cylinders. Obviously, rotation could be opposite. As the pistons roll, the crank arms 30 and 32 will describe the arrow circle in the direction shown around cylinder centers 16 and 18.

In order to seal part of the communicating opening 20 between the cylinders, there is provided a sealing roller 34 that preferably has the same radius as shown as the radius of eccentricity of the pistons in the cylinders as defined by crank arms 30 and 32. The parts are designed and located so that sealing roller 34 partially fills opening 20 centrally thereof and is in rolling contact with each piston 22 and 24 at all times. It will be apparent then that sealing roller 34 also describes a complete circle in its path of travel as the respective pistons roll about their respective cylinders. At no time is there any sliding contact to generate friction.

To provide a timed communication from cylinder 14 to power cylinder 12 for purposes to be described, any suitable type valve means 36 is provided in the opening between the sealing roller 34 and the block 10. Typically, this valve may be disposed in block 10 by any suitable rotating means, such as member 38, so that it can rock in pendulum-like fashion about member 38. Any suitable clearance means 40 may be provided in the block to allow the stem of the valve unhindered travel. It will be apparent that block 10 may be a thin lightweight housing member as diagrammatically shown. This valve means 36 is timed for proper operation with the rolling pistons as will later be apparent. Any suitable interconnecting linkages diagrammatically shown at 41 may be used to ensure proper valve operation in conventional fashion.

For sealing, valve 36 is provided with a sliding contact head 42 that is formed to ride on sealing roller 34 to close the opening from one cylinder to the other until a particular part of the cycle. The valve is shown diagrammatically for simplicity. However, the contact head 42 could be formed to fill some of the opening to minimize the volume and utilize the maximum amount of the compressed charge as will later be apparent. Conveniently, as noted, the sealing roller 34 may be disposed centrally in the opening 20 and is therefore smaller than the opening so that valve means 36 may be biased by linkage 41 against the sealing roller. A similar sealing means 46 that is similarly mounted and biased by means 44 is disposed on the other side of the roller to contact the sealing roller 34 preferably at all times and to close the remainder of the communicating opening 20 between the cylinders. In the one power cylinder operation that will be described for illustration, sealing means 46 maintains contact with sealing roller 34 at all times and thus also rocks back and forth as the sealing roller 34 describes its circular motion upon rotation of the pistons 22 and 24 through a cycle.

In order to develop power, there is at least one intake port 48 disposed in the block to communicate with the periphery of one of the cylinders or cylinder 14 as shown. Similiarly, at least one exhaust port 50 is disposed in the block communicating with the power cylinder 12. Both of these ports are placed in the block substantially opposite the timed or controlled valve means 36 as shown in FIGURE 2.

Since the phase relation between the rotating parts must be proper, a means, later to be described, interconnects the pistons and sealing roller for rotation in unison. However, at this point it is sufficient to note that the parts rotate together in timed relation.

For purposes of comparison in explaining the engine operation, piston 24 may be thought of as a compressor and piston 22 as a turbine in a gas turbine cycle and these pistons describe clockwise rotation about centerlines 18 and 16.

Referring first to FIGURE 2 and piston 24, it may be assumed that a combustible fluid such as carbureted air has already entered through port 48 and is enclosed or trapped to the left of the piston 24 in the compression volume 52 as seen in FIGURE 2. At this time, piston 22 as shown will be at the bottom at the end of its expansion or power stroke which will be understood as the description proceeds. Of course, pure air may be taken in for later fuel injection and compression ignition.

As the compression stroke proceeds, reference to FIGURE 3 illustrates the pistons and the sealing roller after 90° of rotation and it will be seen that the compression volume 52 has decreased rapidly and considerably. The parts assume the position shown wherein the valve means 36 and sealing means 46 rock about their respective pivots to stay in contact with sealing roller 34 which has moved to the position shown. It should be understood that movement of the parts from the positions shown in FIGURE 2 to the positions shown in FIGURE 3 has occurred under pure rolling motion between the pistons, their cylinders, and the sealing roller. No sliding motion is involved of the main parts and occurs only between the rings and the valve means 36 and sealing means 46 with the sealing roller. This, of course, is easily handled.

Rotation continues with rapid compression to the position shown in FIGURE 4 wherein 180° rotation has occurred to substantially end the compression stroke. At this time, the pistons have rolled to the tops of the cylinders as shown and valve means 36 is timed to open under linkage 41 so that the compressed fluid in volume 52 is transferred to cylinder 12 through the opening 20 under control of valve means 36. In this position the sealing roller is also at the top of its circular path.

Referring next to FIGURE 5, the next 45° of rotation is shown and the parts have assumed the positions shown. At this point it will be apparent that suitably forming contact head 42 will minimize the volume of trapped compressed fluid in cylinder 14 as noted above. It is to be noted that substantially all of the compressed fluid has been transferred to the power cylinder 12, valve means 36 has closed to trap the compressed fluid in cylinder 12, and cylinder 14 is almost completely full of a fresh charge of fluid to be compressed having started its intake after piston 24 passed and uncovered intake port 48 during its compression stroke. At this point, the compressed charge 56 starts to burn. If the charge is air it may have fuel injected by means 54 which may represent a fuel injector for compression ignition. If the charge is carbureted air, it is ignited by means 54 which may be a spark plug as noted above. In both cases, means 54 is an ignition means since it initiates combustion.

The combustion having started, the power or expansion stroke in cylinder 12 of power piston 22 is now under way and the piston 22 continues its pure rolling motion around the inner periphery of cylinder 12 to the next position shown at 270° in FIGURE 6. At this point in the cycle, it will be seen that crank arm 30 is developing the maximum power on the downward rolling of piston 22. It should be noted that this is a large piston area that is rapidly exposed to the combustible mixture and that the stroke of the piston—crank arm 30—is relatively short. The resultant pressure force of course is developed by all the forces on the piston whose resultant R is directed through the center 26 of piston 22 to develop the moment on the crank arm. Thus, a large amount of power may be obtained by short stroke rolling of the power piston 22.

The parts continue their pure rolling motion to the next point in the cycle which is back to the positions shown in FIGURE 2 or 360° of rotation. At this point the intake port 48 has been passed by the rolling contact of piston 24 so that the new charge of fluid is being compressed and the volume behind the rolling contact is being filled with fluid for subsequent compression on the next rotation of the piston. Similarly, piston 22 has almost completed its expansion power stroke to exhaust through exhaust port 50 as soon as the rolling contact passes port 50 at which time the piston 22 starts its upward motion preparatory to receiving the next compressed charge by the timed valve from cylinder 14 when piston 22 reaches its topmost position substantially as shown in FIGURE 4. Of course as seen in FIGURE 5, the exhaust gases are discharged from the volume 57 opposite that volume 56 between the rolling contact surfaces between the piston 22 and cylinder 12 and the piston 22 and sealing roller 34 as shown in FIGURE 5.

Thus, it will be apparent that the two pistons rotate in unison and continuously act on fluid and develop a power stroke each revolution and that the sealing roller 34 rolling with the pistons in conjunction with timed valve means 36 controls the communication and thus the fluid transfer between the cylinders to exhaust from one to the other.

In order to obtain power from the rolling piston engine just described, it is important that the two pistons and the sealing roller maintain the proper phase relation with respect to one another. To assure this relation, as seen in FIGURE 7 with the parts shown in phantom, a suitable link 58 shown solid may eccentrically interconnect the three parts—the two pistons and the sealing roller—outside of the block member 10 through shafts 59 so that all the parts rotate together in the same timed relation. These shafts are clearly seen in FIGURE 1. This is similar to a locomotive cross-bar arrangement and the link 58 may be duplicated at 60 in tandem for better balancing and out of phase on the opposite side of block member 10 so that at no time can the engine stall on dead center. FIGURE 7 is intended to best illustrate this for clarity. The power may be taken off a piston by the shafts and transferred to these phase links to be removed. It is of course convenient to also use the pin 62 that connects the link with the piston to support weights not shown to counterbalance the pistons so that dynamic balance may be obtained. Suitable bearings 63 support the members for rotation.

Similarly, suitable gearing means 64 generally shown in FIGURE 8 with idlers 65 interconnecting the roller and pistons may be used in lieu of the connecting links 58 and 60. The advantage of the gears is that the power may be taken directly from the gears since they merely rotate and do not reciprocate as do the links. Balancing is simplified with gears, and the dead center problem of links is eliminated.

In the case of the single rolling piston engine as illustrated in the FIGURES 1 through 6, there is a power stroke every revolution. In order to develop more power and to provide a compact engine, plural sets of the engine structure just described may be disposed in side-by-side relation as shown exploded in FIGURE 9 and as many of these as desired may be stacked to obtain the power required. In this arrangement, it is convenient to use a connecting means, such as a pin 66 that rotates on the centerline 16 to connect directly with a similar pin on the adjacent set and to place the ajacent set out of phase for better balancing as shown by the diagrammatic dotted line connection. It will be apparent that suitably stacking the members then may provide a power stroke every half revolution in the case of two sets or every third of a revolution in the case of three sets and so on. The power may be taken off the outside set by the arrangements of either FIGURES 7 or 8.

It will be apparent that the engine just described may, by suitable modifications, employ a power stroke in each piston by merely duplicating inlets and exhaust ports in each cylinder and by providing a suitably timed valve equivalent to valve means 36 in place of the sealing means 46. Further, any linkage 41 may operate valve means 36 or additional valves if used and linkage 41 may be operated in conjunction with the rolling pistons and sealing roller as diagrammatically indicated by the dotted line either from the gears 64 as shown in FIGURE 8 or from the links 58 and 60 as shown in FIGURE 7. This merely ensures timed relation in a known manner. The block 10 may contain the usual cooling and lubrication passages as needed.

It will be clear that the rolling piston engine has no sliding or friction parts except the piston rings of low sliding velocity and valves riding on sealing roller 34 which may easily be handled and that all the essential moving parts are subject to pure rolling motion with one another. Additionally, the parts are made of easily developed circular members so do not require any unusual or hard-to-produce shapes. The engine may operate, because of its pure rolling eccentric motion, at much higher speeds and thus develop much more power in a lighter weight and smaller volume of engine. Changing the eccentricity, of course, changes the compression ratio and the depth of the pistons and cylinders varies the power. The surface exposed to the power stroke, because of the circular piston surface of piston 22, is very large in relation to its size and the stroke of crank arm 30 is very small. With the pure rolling, sealing problems are avoided and firing takes place once every revolution to provide smoother operation than four cycle reciprocating engines and much simpler operation than prior rotary engines. There is no crankshaft area that is not usable and the engines may be stacked and operated out of phase so that the sets are in perfect dynamic balance and the power pulses per revolution are increased depending on the number of sets that are interconnected.

Of course, the general rolling piston mechanism described, if driven through shaft 59 or pins 66 by other power means, could be used as a fluid compressor or pump with slight valve modifications such as duplicating the equivalent of ports 48 and 50 on opposite sides of the cylinders and keeping valve 36 closed. For example, as seen dotted in FIGURE 7, pressure regulated port 68 might be supplied in cylinder 14 as shown diagrammatically to open on compression (and the equivalent in cylinder 12). Keeping valve means 36 closed then would permit piston 24 to pump fluid through port 68 when opened during compression and the same action would take place in cylinder 12. Further, if the rolling piston engine were supplied with high pressure fluid or gas it could operate as a fluid motor. Thus, the same basic rolling mechanism, with a slight valve modification, becomes a different type of apparatus within the definition of the rolling piston engine.

While there have been described preferred forms of the invention, obvious equivalent variations are possible in light of the above teachings. It is therefore to be understood that within the scope of the appended claims, the invention may be practiced otherwise than as specifically described, and the claims are intended to cover such equivalent variations.

What is claimed is:

1. A rolling piston engine comprising:
   an engine block member,
   a pair of adjacent cylinders in the block with a communicating opening therebetween,
   rolling piston means eccentrically disposed in each cylinder,
   rolling sealing means in part of the opening in contact with the piston means at all times,
   sealing means in another part of the opening cooperating with said rolling means to close the opening,
   fluid intake and exhaust means for each cylinder, and
   power means operably connected to said rolling piston means,
   whereby eccentric rolling of said pistons in said cylinders continuously cycles fluid through said cylinders between the rolling piston means and said cylinders.

2. Apparatus as described in claim 1 wherein connecting means is provided between the rolling pistons and rolling sealing means to rotate said last two means in unison.

3. A rolling piston engine comprising:
   an engine block member,
   a pair of adjacent cylinders in the block with a communicating opening therebetween,
   a smaller diameter piston in each cylinder to roll eccentrically around the inner periphery thereof,
   a sealing roller disposed in and partly filling said opening and in rolling contact with each piston,
   timed valve means in said opening between the sealing roller and block controlling communication between the cylinders,
   a port through said block to each cylinder periphery,
   means connecting the pistons eccentrically of the cylinder centers and connecting said sealing roller to maintain phase relationship between the pistons and roller,
   whereby fluid is compressed by rolling of one piston, transferred through said valve means to the other cylinder for firing and expansion and pure rolling motion between cylindrical surfaces of the pistons and the cylinders produces power, and
   means connected to a piston to remove power from the engine.

4. Apparatus as described in claim 3 wherein the radius of the sealing roller equals the radius of eccentricity of the pistons in the cylinders.

5. Apparatus as described in claim 3 where said ports include at least one intake port in one cylinder and at least one exhaust port from the other cylinder.

6. Apparatus as described in claim 3 where said sealing roller partly filling said opening leaves a space on opposite sides thereof and said timed valve controls passage of fluid through one space, and
   sealing means is disposed in said opposite space to seal between said cylinders.

7. Apparatus as described in claim 3 where said phase connecting means in a link disposed on opposite sides of the block in tandem.

8. Apparatus as described in claim 3 where said phase connecting means is gear structure interconnecting the sealing roller and pistons.

9. Apparatus as described in claim 3 wherein plural sets of said apparatus are disposed side-by-side, and
   said phase connecting means also connects with the adjacent set,
   the adjacent sets being out of phase with one another.

10. A rolling piston engine comprising:
    an engine block member,
    a pair of adjacent cylinders with parallel centerlines in said block,
    said cylinders having a communicating opening therebetween,
    a smaller diameter cylindrical piston in each cylinder to roll eccentrically around the inner periphery thereof,
    a sealing roller disposed centrally in and being smaller than said communicating opening,
    said roller contacting said pistons in rolling contact,
    timed valve means in said block extending into said opening on one side of said roller and biased in contact therewith to control communication between said cylinders,
    sealing means on the other side of said roller biased into contact with said roller at all times,
    at least one intake port in said block to one cylinder, and
    at least one exhaust port from the other power cylinder substantially opposite said valve,
    means connecting the pistons in tandem and eccentrically of the cylinder centers,
    said means also connecting said sealing roller and valve to maintain phase relationship between the pistons, valve, and sealing roller,
    ignition means in said power cylinder,
    whereby fluid is compressed in one cylinder by roll of the poston therein, transferred through said valve means to the power cylinder for firing and expansion and pure rolling motion between cylindrical surfaces of the pistons in the cylinders both seals and produces power, and
    means connected to the piston in said power cylinder to remove power from the engine.

11. Apparatus as described in claim 10 wherein the radius of the sealing roller equals the radius of eccentricity of the pistons in the cylinders.

12. Apparatus as described in claim 10 where said phase connecting means is a link disposed on opposite sides of the pistons in tandem and out of phase with one another to avoid dead center.

13. Apparatus as described in claim 10 where said phase connecting means is gear structure interconnecting the sealing rotor and pistons.

14. Apparatus as described in claim 10 wherein plural sets of said structure are disposed side-by-side, and
said phase connecting means also connects with the adjacent set,
the adjacent sets being out of phase with one another.

15. Apparatus as described in claim 10 wherein said ignition means is a fuel injector.

16. Apparatus as described in claim 10 wherein said ignition means is a spark plug.

References Cited

UNITED STATES PATENTS

| | | | |
|---|---|---|---|
| 785,248 | 3/1905 | Yokouchi | 103—123 |
| 2,237,591 | 4/1941 | Dumarest | 91—56 X |
| 3,190,228 | 6/1965 | Griger | 103—123 X |

MARK NEWMAN, *Primary Examiner.*

R. D. BLAKESLEE, *Assistant Examiner.*